United States Patent
Lin

(10) Patent No.: US 11,249,676 B2
(45) Date of Patent: Feb. 15, 2022

(54) ELECTRONIC DEVICE, FLASH MEMORY CONTROLLER AND ASSOCIATED CONTROL METHOD

(71) Applicant: Silicon Motion, Inc., Hsinchu County (TW)

(72) Inventor: Wen-Sheng Lin, Kaohsiung (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

(21) Appl. No.: 17/086,450

(22) Filed: Nov. 1, 2020

(65) Prior Publication Data

US 2022/0004331 A1 Jan. 6, 2022

(30) Foreign Application Priority Data

Jul. 2, 2020 (TW) ................................ 109122423

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
None
See application file for complete search history.

(56) References Cited

U.S. PATENT DOCUMENTS

| 8,667,209 B2 | 3/2014 | Lin |
| 9,684,468 B2 | 6/2017 | Fisher |
| 2006/0153033 A1* | 7/2006 | Saito .................. G11B 5/09 369/47.33 |
| 2020/0278806 A1* | 9/2020 | Hsieh ................. G06F 3/0679 |

FOREIGN PATENT DOCUMENTS

| CN | 102306125 A | 1/2012 |
| TW | 201407349 A | 2/2014 |
| TW | 201804311 A | 2/2018 |
| TW | 201828065 A | 8/2018 |
| TW | I697778 B | 7/2020 |

* cited by examiner

Primary Examiner — Jane Wei
(74) Attorney, Agent, or Firm — Winston Hsu

(57) ABSTRACT

A flash memory controller includes a read-only memory, a microprocessor and a buffer memory, wherein the buffer memory includes a data temporary storage area having continuous addresses. When the flash memory controller receives data from a host device, the microprocessor determines whether there is enough space between the last stored data in the data temporary storage area and an end address of the data temporary storage area to store the entire content of the data. If there is not enough space between the last stored data in the data temporary storage area and the end address to store the entire content of the data, the microprocessor directly stores the data from a starting address in the data temporary storage area, without writing any part of the data to the area before the end address of the data temporary storage area.

12 Claims, 6 Drawing Sheets

ELECTRONIC DEVICE, FLASH MEMORY CONTROLLER AND ASSOCIATED CONTROL METHOD

BACKGROUND OF THE INVENTION

1. Field of the Invention

The present invention relates to a flash memory, and more particularly, to a flash memory and an associated control method.

2. Description of the Prior Art

With development of three-dimensional (3D) flash memory, the number of stacked layers increases, the quality of data stored in the flash memory becomes unstable, and the method for writing data to the flash memory would also affect the data quality. Therefore, how to develop a high efficiency and high data quality write method with a good write amplification index (WAI) is an important issue.

SUMMARY OF THE INVENTION

One of the objectives of the present invention is to provide a flash memory controller and an associate control method, such that the data being written in a flash memory has a better quality, and the method has a good write amplification index (WAI), to solve the above-mentioned problems.

According to one embodiment of the present invention, a flash memory controller is configured to access a flash memory module. The flash memory controller includes a read-only memory (ROM), a microprocessor and a buffer memory. The read-only memory is configured to store a code. The microprocessor is configured to execute the code to control access of the flash memory module. The buffer memory includes a data temporary storage area having continuous addresses, wherein the continuous addresses include a starting address and an end address, and the data temporary storage area is configured to temporarily store data from a host device. When the flash memory controller receives a data from the host device, the microprocessor determines whether there is enough space between a last stored data in the data temporary storage area and the end address of the data temporary storage area to store an entire content of the data. If there is enough space between the last stored data in the data temporary storage area and the end address to store a partial content of the data but not enough space to store the entire content of the data, the microprocessor directly stores the data from the starting address in the data temporary storage area, without writing any part of the data to an area between the last stored data in the data temporary storage area and the end address of the data temporary storage area.

According to another embodiment of the present invention, an electronic device includes a flash memory module and a flash memory controller, wherein the flash memory controller includes a buffer memory. The buffer memory includes a data temporary storage area having continuous addresses, wherein the continuous addresses include a starting address and an end address, and the data temporary storage area is configured to temporarily store data from a host device. When the flash memory controller receives a data from the host device, the flash memory controller determines whether there is enough space between a last stored data in the data temporary storage area and the end address of the data temporary storage area to store an entire content of the data. If there is enough space between the last stored data in the data temporary storage area and the end address to store a partial content of the data but not enough space to store the entire content of the data, the flash memory controller directly stores the data from the starting address in the data temporary storage area, without writing any part of the data to an area between the last stored data in the data temporary storage area and the end address of the data temporary storage area.

According to another embodiment of the present invention, a control method for controlling a flash memory controller includes: programming a data temporary storage area having continuous addresses in a buffer memory of the flash memory controller, wherein the continuous addresses include a starting address and an end address, and the data temporary storage area is configured to temporarily store data from a host device; receiving a data from the host device; determining whether there is enough space between a last stored data in the data temporary storage area and the end address of the data temporary storage area to store an entire content of the data; and if there is enough space between the last stored data in the data temporary storage area and the end address to store a partial content of the data but not enough space to store the entire content of the data, directly storing the data from the starting address in the data temporary storage area, without writing any part of the data to an area between the last stored data in the data temporary storage area and the end address of the data temporary storage area.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
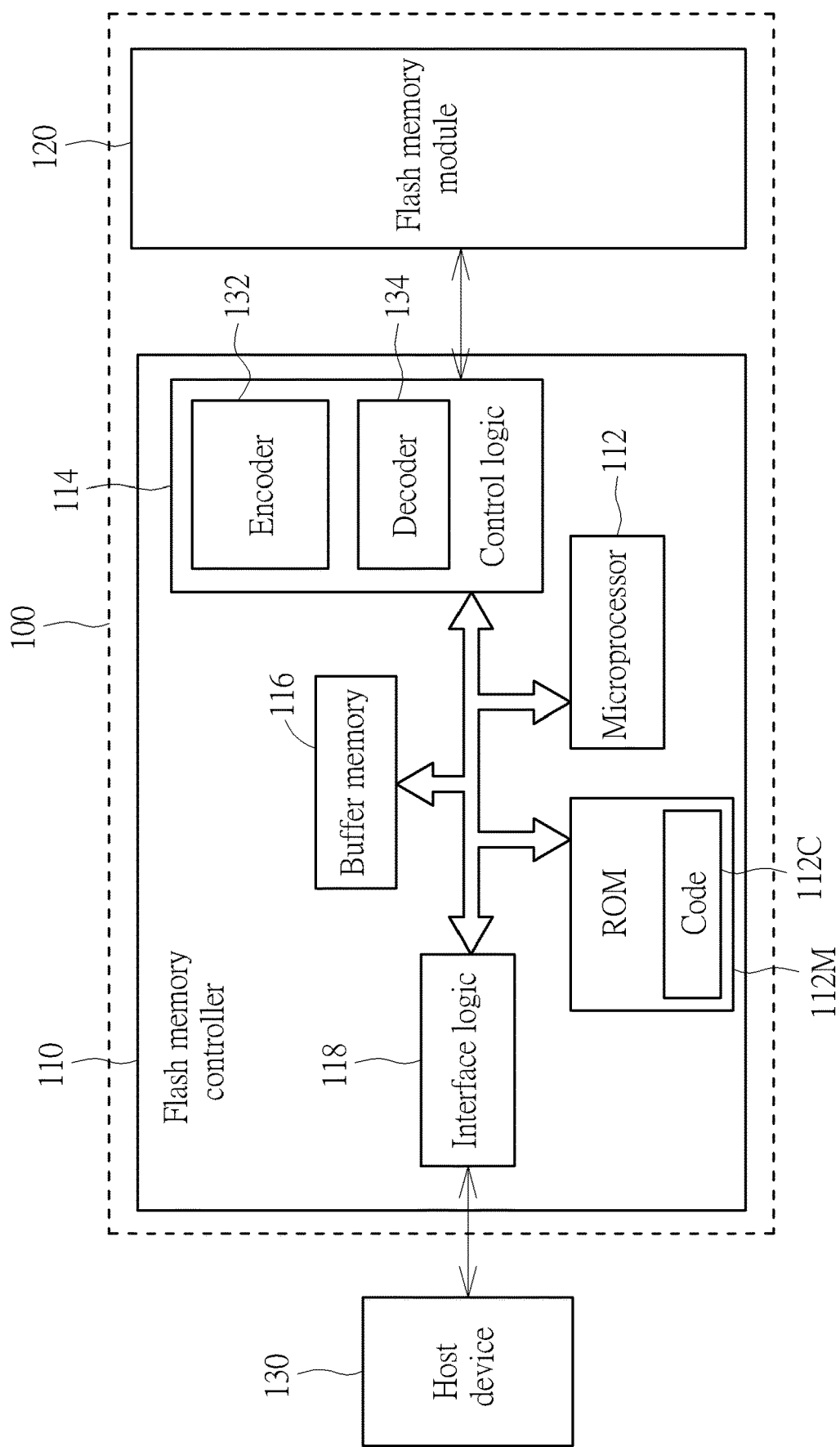
FIG. 1 is a diagram illustrating an electronic device according to an embodiment of the present invention.

FIG. 1 is a diagram illustrating an electronic device 100 according to an embodiment of the present invention. The electronic device 100 includes a flash memory module 120 and a flash memory controller 110, and the flash memory controller 110 is configured to access the flash memory module 120. According to the present embodiment, the flash memory controller 110 includes a microprocessor 112, a read only memory (ROM) 112M, a control logic 114, a buffer memory 116 and an interface logic 118. The ROM 112M is configured to store a code 112C, and the microprocessor 112 is configured to execute the code 112C to control access of the flash memory module 120. The control logic 114 includes an encoder 132 and a decoder 134, wherein the encoder 132 is configured to encode data which is written in the flash memory module 120 to generate a corresponding check code (also known as an error correction code (ECC)), and the decoder 134 is configured to decode data read from the flash memory module 120.

In a general situation, the flash memory module 120 includes a plurality of flash memory chips, and each flash memory chip includes a plurality of blocks. The flash memory controller 110 performs a block-based erase operation upon the flash memory module 120. In addition, a block can record a specific number of pages, wherein the flash memory controller 110 performs a page-based write operation upon the flash memory module 120. In the present embodiment, the flash memory module 120 is a 3D NAND-type flash module.

In practice, through the microprocessor 112 executing the code 112C, the flash memory controller 110 may use its own internal components to perform many control operations. For example, the flash memory controller 110 uses the control logic 114 to control access of the flash memory module 120 (especially access of at least one block or at least one page), uses the buffer memory 116 to perform a required buffering operation, and uses the interface logic 118 to communicate with a host device 130. The buffer memory 116 is implemented by a random access memory (RAM). For example, the buffer memory 116 can be a static RAM (SRAM), but the present invention is not limited thereto.

In one embodiment, the electronic device 100 can be a portable memory device such as a memory card which conforms to one of the SD/MMC, CF, MS and XD specifications, and the host device 130 is another electronic device able to be connected to the electronic device 100, such as a cellphone, a laptop, a desktop computer, etc. In another embodiment, the electronic device 100 can be a solid state drive (SSD) or an embedded memory device which conforms to the universal flash storage (UFS) specification or embedded Multi Media Card (EMMC) specification, and can be arranged in a cellphone, a laptop or a desktop computer. At this time, the host device 130 can be a processor of the cellphone, a processor of the laptop or a processor of the desktop computer.

Figure 2:
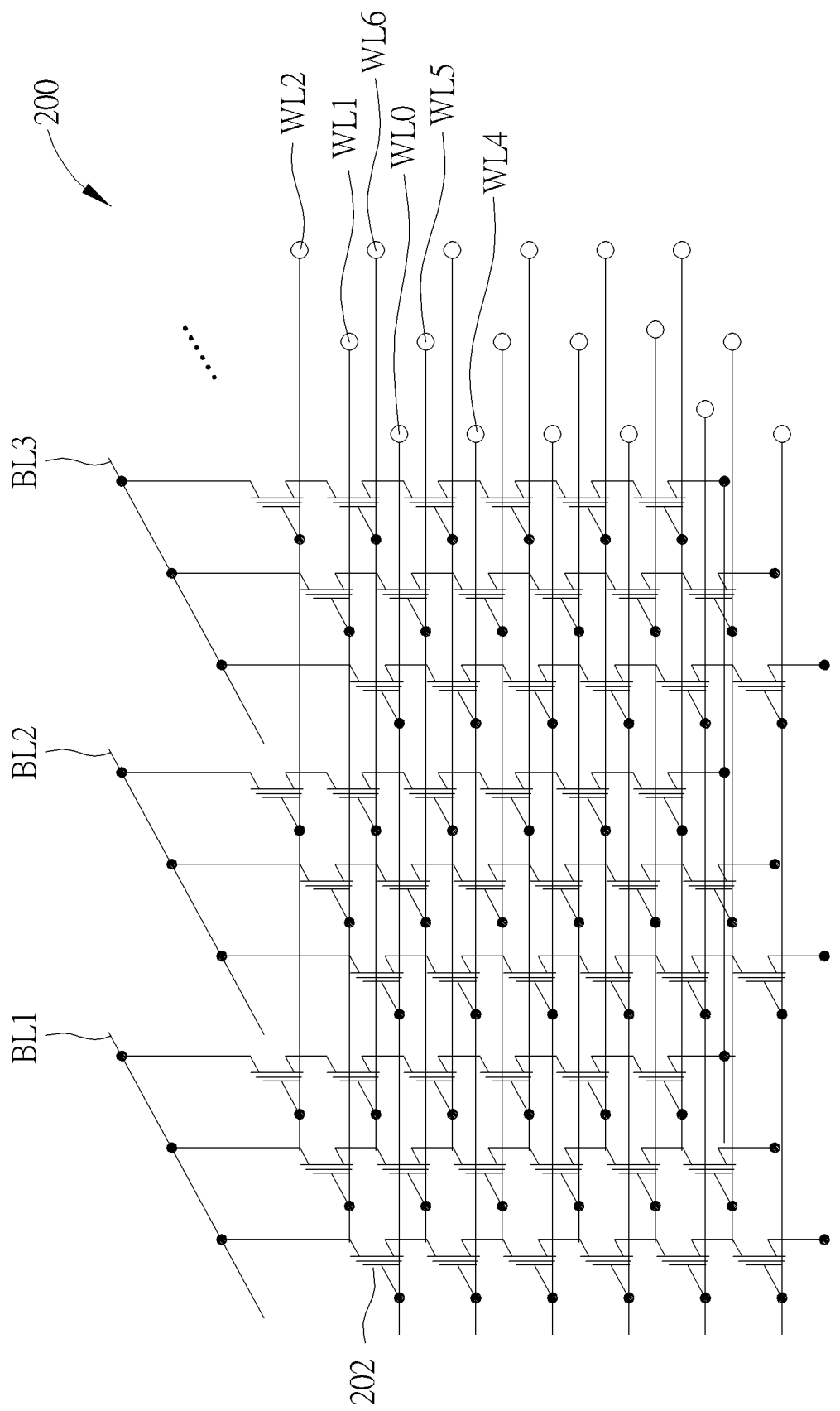
FIG. 2 is a diagram illustrating a block in a flash memory module according to an embodiment of the present invention.

FIG. 2 is a diagram illustrating a block 200 of the flash memory module 120 according to an embodiment of the present invention, wherein the flash memory module 120 is a 3D NAND-type flash memory module. As shown in FIG. 2, the block 200 includes a plurality of memory cells, such as floating gate transistors 202 shown in FIG. 2 or other charge trapping components. A 3D NAND-type flash memory structure is formed through a plurality of bit lines (only BL1-BL3 are shown in FIG. 2) and a plurality of word lines (e.g., WL0-WL2 and WL4-WL6 shown in FIG. 2). Taking a top plane in FIG. 2 as an example, all floating gate transistors on the word line WL0 form at least one page, all floating gate transistors on the word line WL1 format least another one page, and so on. In addition, the definition between the word line WL0 and the page (logic page) may vary depending on a writing method of the flash memory. In detail, when data are stored using a Single-Level cell (SLC) means, all floating gate transistors on the word line WL0 correspond to only one logic page; when data are stored using Multi-Level cell (MLC) means, all floating gate transistors on the word line WL0 correspond to two logic pages; when data are stored using Triple-Level cell (TLC) means, all floating gate transistors on the word line WL0 correspond to three logic pages; and when data are stored using Quad-Level cell (QLC) means, all floating gate transistors on the word line WL0 correspond to four logic pages. The 3D NAND-type flash memory structure and the relationship between word lines and pages are obvious to those skilled in the art. For simplification, no further illustration is provided.

Figure 3:
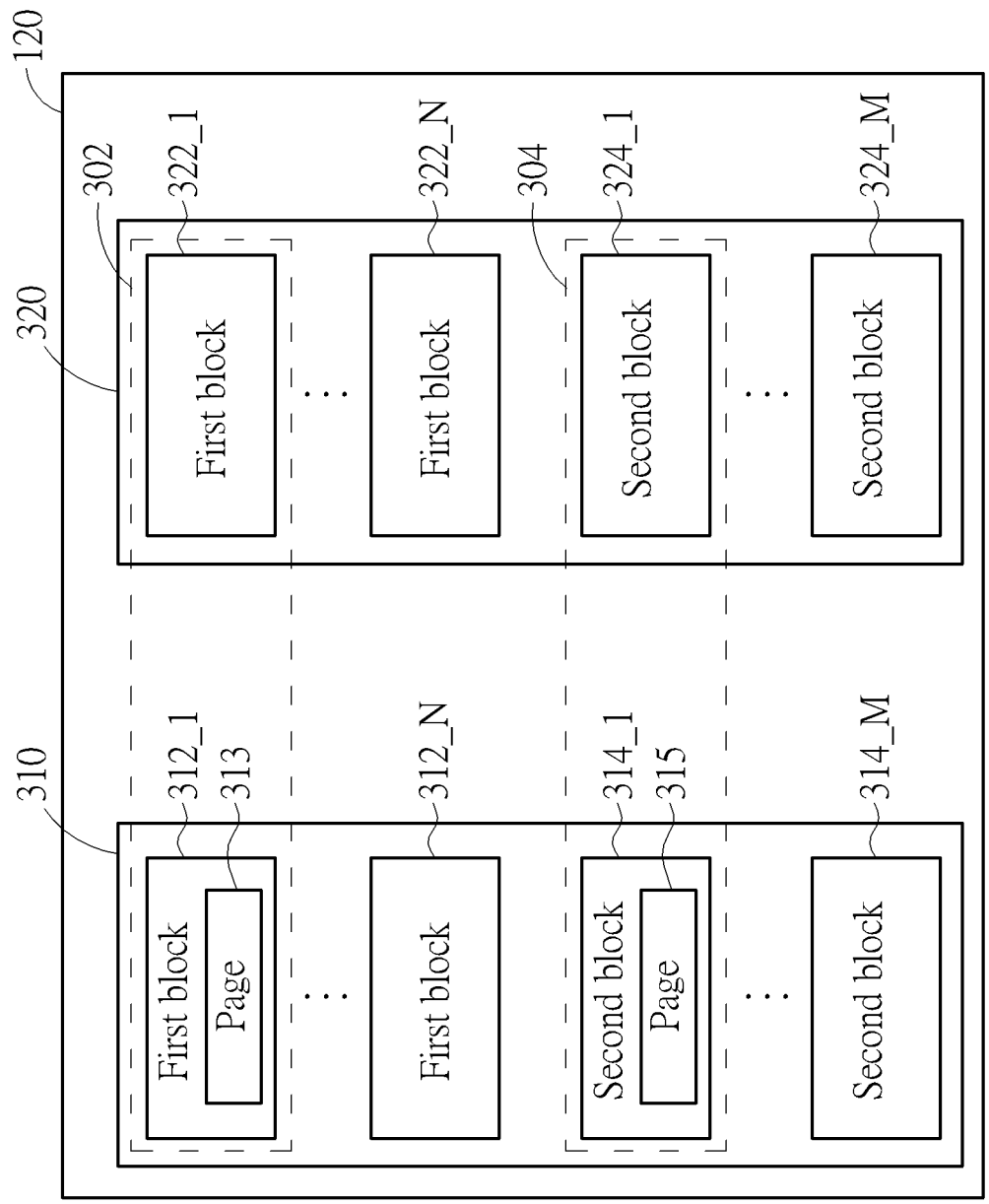
FIG. 3 is a diagram illustrating the flash memory module including a plurality of first blocks and a plurality of second blocks according to an embodiment of the present invention.

FIG. 3 is a diagram illustrating the flash memory module 120 according to an embodiment of the present invention. As shown in FIG. 3, the flash memory module 120 includes a plurality of storage planes (in the present embodiment, take two storage planes 310, 320 as an example for illustrative purposes). The storage plane 310 at least includes a plurality of first blocks 312_1-312_N and a plurality of second blocks 314_1-314_M, and the storage plane 320 at least includes a plurality first blocks 322_1-322_N and a plurality of second blocks 324_1-324_M, wherein N and M are any suitable positive integers. Each block of the plurality of first blocks 322_1-322_N includes a plurality of pages, e.g. the first block 312_1 includes a page 313 as shown in FIG. 3; each block of the plurality of second blocks 322_1-322_N includes a plurality of pages, e.g. the second block 322_1 includes a page 315 as shown in FIG. 3. In the present embodiment, blocks of the storage planes 310, 320 form a plurality of super blocks. For example, the first block 312_1 of the storage plane 310 and the first block 322_1 of the storage plane 320 form the super block 302, wherein the first blocks 312_1 and 322_1 in the super block 302 are accessed or erased at the same time. For example, when the flash memory controller 110 writes data in the super block 302, a piece of data can be sequentially written to the page of the first block 312_1 and the page of the first block 322_1 of the storage plane 320, or can be interleavingly written to the page of the first block 312_1 and the page of the first block 322_1 of the storage plane 320. In another embodiment, the second block 314_1 of the storage plane 310 and the second block 324_1 of the storage plane 320 form the super block 304, wherein the second blocks 314_1 and 324_1 in the super block 304 are accessed or erased at the same time. For example, when the flash memory controller 110 writes data in the super block 304, a piece of data can be sequentially written to the page of the second block 314_1 and the page of the second block 324_1 of the storage plane 320, or can be interleavingly written to the page of the second block 314_1 and the page of the second block 324_1 of the storage plane 320.

In the present embodiment, the first blocks 312_1-312_N of the storage plane 310 and the first blocks 322_1-322_N of the storage plane 320 are all SLC blocks, and the second blocks 314_1-314_M of the storage plane 310 and the second blocks 324_1-324_M of the storage plane 320 are all MLC blocks, TLC blocks or QLC blocks. For brevity and simplicity, the description of the following embodiment is based on the assumption that the second blocks 314_1-314_M and the second blocks 324_1-324_M are all MLC blocks, that is to say, all memory cells on a single word line form two pages. The present invention is not limited thereto, however.

The first blocks 312_1-312_N, 322_1-322_N and the second blocks 314_1-314_M, 322_4-324_M in FIG. 3 are configured to directly store the write-in data from the flash memory controller 110, and can also be called as temporary storage blocks. The flash memory module 120 may additionally include a plurality data blocks for storing valid data from the above temporary storage blocks in subsequent operations. For effectively using the flash memory module 120, when the data written by the flash memory controller 110 has a small amount of data, such as a plurality of 4 kilobytes (KB) piecemeal data, these data will be written in the first blocks 312_1-312_N, 322_1-322_N; in addition, when the data written by the flash memory controller 110 has a large amount of data (greater than 4 KB), these data will be written into the second blocks 314_1-314_M, 324_1-324_M to effectively use the storage space of the flash memory module 120.

The flash memory module 120 is a 3D flash memory module with a stacked structure. After relevant experiments and measurements, one shot programing is a better way for data writing in MLC blocks, TLC blocks and QLC blocks, and is capable of reducing the number of error bits effectively to improve the writing quality. Specifically, taking the super block 304 including two MLC blocks in the flash memory module 120 as an example and assuming that the size of a page is 16 kilobytes (KB), the amount of data (the minimum amount of data) written into the super block 304 for one shot programing is 64 KB (that is, 16 KB*2*2=64 KB) due to the fact that all memory cells on a single word line form two pages, and the second blocks 314_1 and 324_1 need to perform data writing at the same time. Similarly, the amount of data written in the super block 304 including SLC blocks is 32 KB; if the super block includes two TLC blocks, the amount of data written for one shot programing is 96 KB (that is, 16 KB*3*2=96 KB); and if the super block includes two QLC blocks, the amount of data written for one shot programing is 128 KB (that is, 16 KB*4*2=128 KB).

As described above, since the amount of data written for one shot programing in the super block 302 including the SLC blocks is 32 KB, and the amount of data written for one shot programing in the super block 304 including the MLC blocks is 64 KB, when the flash memory controller 110 receives the data from the host device 130, the data is temporarily stored in the buffer memory 116, and the data stored in the buffer memory 116 will be further moved to the flash memory module 120 at an appropriate time. However, since the amount of data from the host device 130 is not consistent, the storage space of the buffer memory 116 may not be able to allow each data to have continuous addresses, which may cause the data that should be written in the super block 304 to be written to the super block 302. As a result, the utilization rate of the flash memory module 120 is affected and the write amplification index (WAI) is increased. Therefore, in the following embodiment, a method for accessing the buffer memory 116 is proposed to effectively solve this problem.

Figure 4:
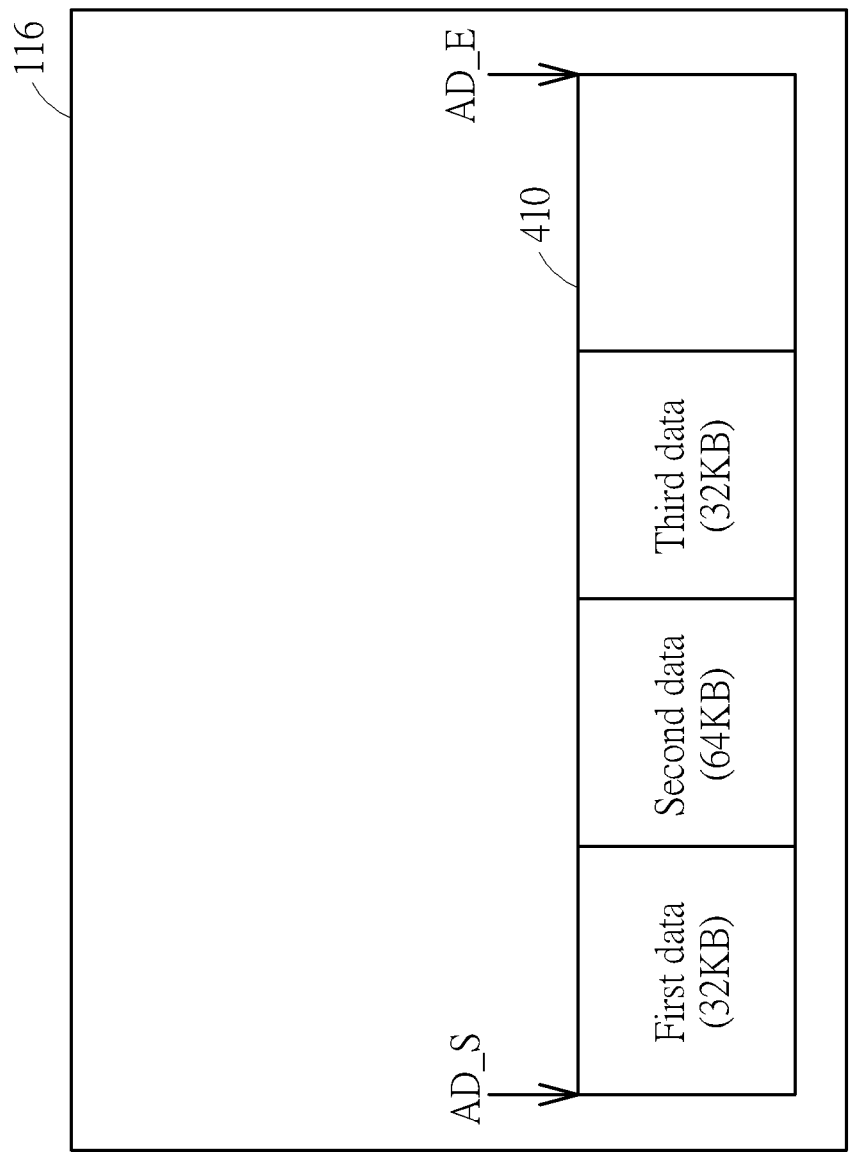
FIG. 4 is a diagram illustrating programing a data temporary storage area in a buffer memory according to an embodiment of the present invention.

Specifically, the microprocessor 112 may program the buffer memory 116 to have a data temporary storage area 410 as shown in FIG. 4, wherein the data temporary storage area 410 has continuous addresses, and the continuous addresses include a starting address AD_S and an end address AD_E. In an embodiment, the size of the temporary data storage area 410 can be an integer multiple of the amount of data written for one shot programing in the super block 304. For example, it may be 8 times the data amount of 64 KB, that is, 512 KB. When the flash memory controller 110 receives the data from the host device 130, the microprocessor 112 sequentially writes the data in addresses starting from the starting address AD_S. Taking FIG. 4 as an example, the microprocessor 112 writes a first data from the host device 130 in a section of 32 KB continuous addresses starting from the start address AD_S (it should be noticed that the first data can be a combination of multiple data from the host device 130), and writes a second data from the host device 130 in a section of 64 KB continuous addresses immediately after the first data, and writes a third data from the host device 130 in a section of 32 KB continuous addresses immediately after the second data, and so on. Since the first data is only 32 KB, the microprocessor 112 writes the first data in the super block 302 of the flash memory module 120 at an appropriate time, and after the first data is written, the microprocessor 112 directly deletes the first data in the data temporary storage area 410 in order to store other data. Then, since the second data is 64 KB, the microprocessor 112 writes the second data in the super block 304 of the flash memory module 120 by one shot programing at an appropriate time, and after the second data is written, the microprocessor 112 directly deletes the second data in the data temporary storage area 410 to store other data. Then, since the third data is only 32 KB, the microprocessor 112 writes the third data in the super block 302 of the flash memory module 120 at an appropriate time, and after the third data is written, the microprocessor 112 directly deletes the third data in the data temporary storage area 410 to store other data.

As mentioned above, the size of the temporary data storage area 410 is an integer multiple of the amount of data that can be written in the super block 304 for one shot programing, but the amount of data stored in the temporary data storage area 410 may be 32 KB or 64 KB. Therefore, it is possible that there is an empty 32 KB storage space left between a last stored data and the end address AD_E in the data temporary storage area 410. Taking FIG. 5 as an example and assuming that the last stored data in the temporary data storage area 410 is an $A^{th}$ data, there is only a 32 KB storage space left after the $A^{th}$ data is stored. At this time, if an $(A+1)^{th}$ data is 64 KB, the microprocessor 112 directly gives up the 32 KB storage space left after the $A^{th}$ data is stored in the data temporary storage area 410, and directly writes the $(A+1)^{th}$ data to 64 KB continuous addresses starting from the starting address AD_S. In detail, a write operation of a traditional SRAM writes the data to the storage space between the last stored data and the end address AD_E, and then moves back to the start address AD_S to continue writing the data. In other words, traditionally, the $(A+1)^{th}$ data is divided into two parts each having 32 KB, where a first part is written to the 32 KB storage space between the $A^{th}$ data and the end address AD_E, and a second part is written to 32 KB continuous addresses starting from the starting address AD_S. However, this write method makes the microprocessor 112 treat the $(A+1)^{th}$ data as two different data chunks, and the first part of the $(A+1)^{th}$ data is first written in the super block 302 including the SLC blocks, and then the second part of the $(A+1)^{th}$ data is written in the super block 302 including the SLC block. Due to the operation of the traditional memory, the $(A+1)^{th}$ data that could be written to the super block 304 including the MLC blocks is written to the super block 302 including the SLC blocks, such that the write amplification index of the flash memory module 120 is affected. As mentioned above, when the remaining space between the last stored data in the data temporary storage area 410 and the end address AD_E is not enough to store the whole next data ($(A+1)^{th}$ data), the present embodiment directly writes the $(A+1)^{th}$ data into the data temporary storage area 410 from the start address AD_S of the data temporary storage area 410, without writing any part of the (A+1)th data to the area between the last stored data in the data temporary storage area 410 and the end address AD_E. In this way, the data that could be written to the super block 304 can be effectively prevented from being written to the super block 302 for discontinuous memory addresses.

Figure 5:
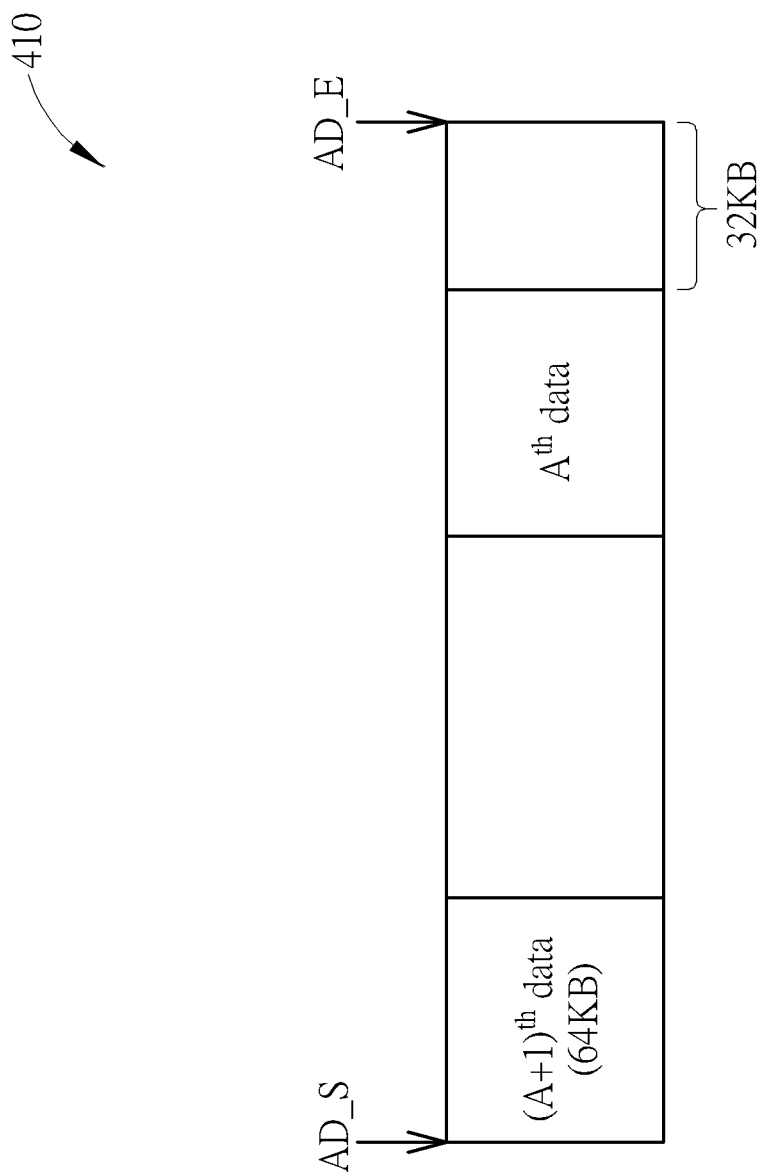
FIG. 5 is a diagram illustrating how to write the next data when the remaining space after the last stored data in the data temporary storage area according to an embodiment of the present invention.

In addition, the microprocessor 112 will sequentially write the following data from the host device 130 to continuous addresses of following addresses of the $(A+1)^{th}$ data. That is, the 32 KB storage space between the $A^{th}$ data and the end address as shown in FIG. 5 would be maintained as a blank area until the $A^{th}$ data is deleted, and then the 32 KB storage space can be used for storing subsequent data.

Figure 6:
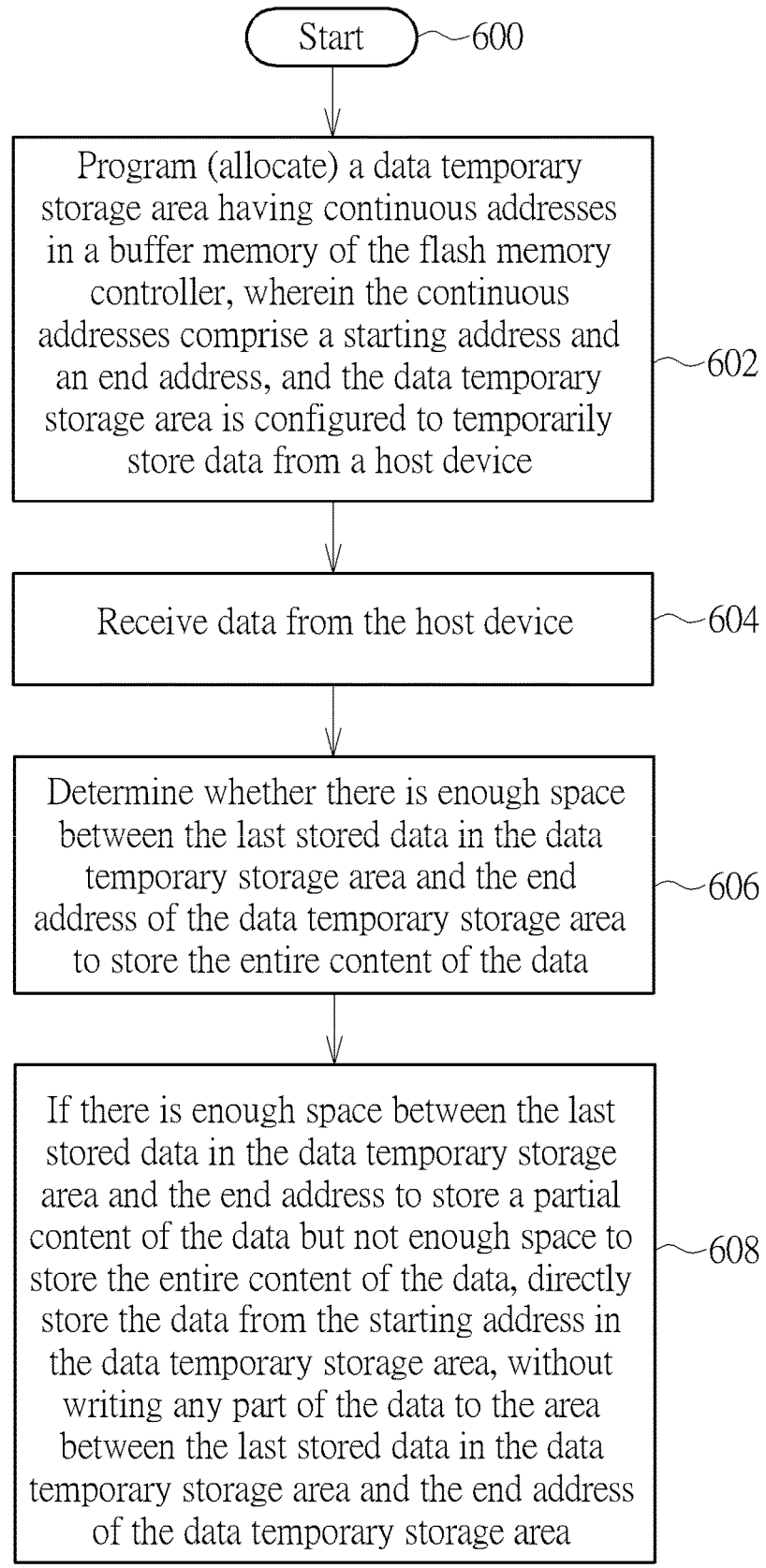
FIG. 6 is a flowchart illustrating a control method for controlling the flash memory controller.

FIG. 6 is a flowchart illustrating a control method for controlling the flash memory controller according to an embodiment of the present invention. Referring to the description above, the method of the present invention comprises the following steps:

Step 600: Start the flow;

Step 602: Program (allocate) a data temporary storage area having continuous addresses in a buffer memory of the flash memory controller, wherein the continuous addresses comprise a starting address and an end address, and the data temporary storage area is configured to temporarily store data from a host device;

Step 604: Receive data from the host device;

Step 606: Determine whether there is enough space between the last stored data in the data temporary storage area and the end address of the data temporary storage area to store the entire content of the data; and Step 608: if there is enough space between the last stored data in the data temporary storage area and the end address to store a partial content of the data but not enough space to store the entire content of the data, directly store the data from the starting address in the data temporary storage area, without writing any part of the data to the area between the last stored data in the data temporary storage area and the end address of the data temporary storage area.

To briefly summarize the present invention, in the flash memory controller of the present invention, through the programing of the internal buffer memory and writing method, it may be ensured that the data can be written in the MLC blocks, the TLC blocks or the QLC blocks would not be written in the SLC blocks, to improve the utilization rate of the flash memory module.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A flash memory controller configured to access a flash memory module, comprising:
   a read-only memory (ROM), configured to store a code;
   a microprocessor, configured to execute the code to control access of the flash memory module; and
   a buffer memory, comprising a data temporary storage area having continuous addresses, wherein the continuous addresses comprise a starting address and an end address, and the data temporary storage area is configured to temporarily store data from a host device;
   wherein when the flash memory controller receives a data from the host device, the microprocessor determines whether there is enough space between a last stored data in the data temporary storage area and the end address of the data temporary storage area to store an entire content of the data; in response to determining there is enough space between the last stored data in the data temporary storage area and the end address to store a partial content of the data but not enough space to store the entire content of the data, the microprocessor directly stores the data from the starting address in the data temporary storage area, without writing any part of the data to an area between the last stored data in the data temporary storage area and the end address of the data temporary storage area.

2. The flash memory controller of claim 1, wherein before the last stored data in the data temporary storage area is deleted, the flash memory controller does not write any data to the area between the last stored data in the data temporary storage area and the end address of the data temporary storage area.

3. The flash memory controller of claim 1, wherein the flash memory module comprises a plurality of first blocks and a plurality of second blocks, where each first block of the plurality of first blocks is a single-level cell (SLC) block, and each second block of the plurality of second blocks is a multi-level cell (MLC) block, a triple-level cell (TLC) block or a quad-level cell (QLC) block; and a size of the data temporary storage area is an integer multiple of an amount of data of the second block for one shot programing.

4. The flash memory controller of claim 1, wherein the flash memory module comprises a plurality of first blocks and a plurality of second blocks, where each first block of the plurality of first blocks is a single-level cell (SLC) block, and each second block of the plurality of second blocks is a multi-level cell (MLC) block, a triple-level cell (TLC) block or a quad-level cell (QLC) block; an amount of data of the first block for one shot programing is a first amount of data, an amount of data of the second block for one shot programing is a second amount of data; for any data with continuous addresses stored in the data temporary storage area, if an amount of the any data is the first amount of data, the microprocessor moves the any data to one of the plurality of first blocks, and if the amount of the any data is the second amount of data, the microprocessor moves the any data to one of the plurality of second blocks.

5. The flash memory controller of claim 1, wherein the buffer memory is a static random access memory (SRAM).

6. An electronic device, comprising:
   a flash memory module; and
   a flash memory controller, wherein the flash memory controller comprises a buffer memory, the buffer memory comprises a data temporary storage area having continuous addresses, the continuous addresses comprise a starting address and an end address, and the data temporary storage area is configured to temporarily store data from a host device;
   wherein when the flash memory controller receives a data from the host device, the flash memory controller determines whether there is enough space between a last stored data in the data temporary storage area and the end address of the data temporary storage area to store an entire content of the data; in response to determining there is enough space between the last stored data in the data temporary storage area and the end address to store a partial content of the data but not enough space to store the entire content of the data, the flash memory controller directly stores the data from the starting address in the data temporary storage area, without writing any part of the data to an area between the last stored data in the data temporary storage area and the end address of the data temporary storage area.

7. The electronic device of claim 6, wherein before the last stored data in the data temporary storage area is deleted, the flash memory controller does not write any data to the area between the last stored data in the data temporary storage area and the end address of the data temporary storage area.

8. The electronic device of claim 6, wherein the flash memory module comprises a plurality of first blocks and a plurality of second blocks, where each first block of the plurality of first blocks is a single-level cell (SLC) block, and each second block of the plurality of second blocks is a multi-level cell (MLC) block, a triple-level cell (TLC) block or a quad-level cell (QLC) block; and a size of the data temporary storage area is an integer multiple of an amount of data of the second block for one shot programing.

9. The electronic device of claim 6, wherein the flash memory module comprises a plurality of first blocks and a plurality of second blocks, wherein each first block of the plurality of first blocks is a single-level cell (SLC) block, and each second block of the plurality of second blocks is a multi-level cell (MLC) block, a triple-level cell (TLC) block or a quad-level cell (QLC) block; an amount of data of the first block for one shot programing is a first amount of data, an amount of data of the second block for one shot programing is a second amount of data; for any data with continuous addresses stored in the data temporary storage area, if an amount of the any data is the first amount of data, the flash memory controller moves the any data to one of the plurality of first blocks, and if the amount of the any data is the second amount of data, the flash memory controller moves the any data to one of the plurality of second blocks.

10. A control method for controlling a flash memory controller, comprising:
  programming a data temporary storage area having continuous addresses in a buffer memory of the flash memory controller, wherein the continuous addresses comprise a starting address and an end address, and the data temporary storage area is configured to temporarily store data from a host device;
  receiving a data from the host device;
  determining whether there is enough space between a last stored data in the data temporary storage area and the end address of the data temporary storage area to store an entire content of the data; and
  in response to determining there is enough space between the last stored data in the data temporary storage area and the end address to store a partial content of the data but not enough space to store the entire content of the data, directly storing the data from the starting address in the data temporary storage area, without writing any part of the data to an area between the last stored data in the data temporary storage area and the end address of the data temporary storage area.

11. The control method of claim 10, wherein the flash memory controller is configured to control a flash memory module, the flash memory module comprises a plurality of first blocks and a plurality of second blocks, each first block of the plurality of first blocks is a single-level cell (SLC) block, and each second block of the plurality of second blocks is a multi-level cell (MLC) block, a triple-level cell (TLC) block or a quad-level cell (QLC) block; and a size of the data temporary storage area is an integer multiple of an amount of data of the second block for one shot programing.

12. The control method of claim 10, wherein the flash memory controller is configured to control a flash memory module, the flash memory module comprises a plurality of first blocks and a plurality of second blocks, where each first block of the plurality of first blocks is a single-level cell (SLC) block, and each second block of the plurality of second blocks is a multi-level cell (MLC) block, a triple-level cell (TLC) block or a quad-level cell (QLC) block; an amount of data of the first block for one shot programming is a first amount of data, an amount of data of the second block for one shot programming is a second amount of data; and the control method further comprises:
  for any data with continuous addresses stored in the data temporary storage area:
    if an amount of the any data is the first amount of data, moving the any data to one of the plurality of first blocks; and
    if the amount of the any data is the second amount of data, moving the any data to one of the plurality of second blocks.

* * * * *